April 16, 1935.  R. J. STREB ET AL  1,998,340
HYGROSTAT
Filed Sept. 3, 1932  4 Sheets-Sheet 2
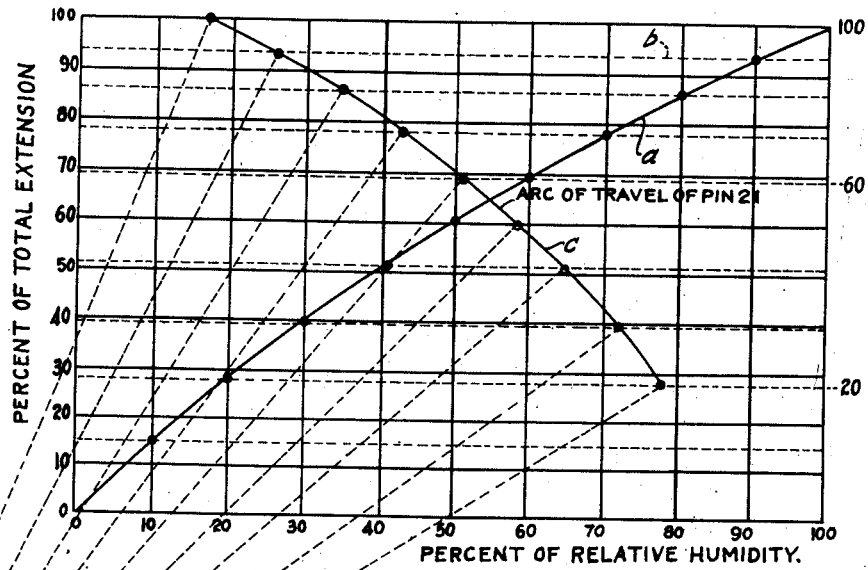
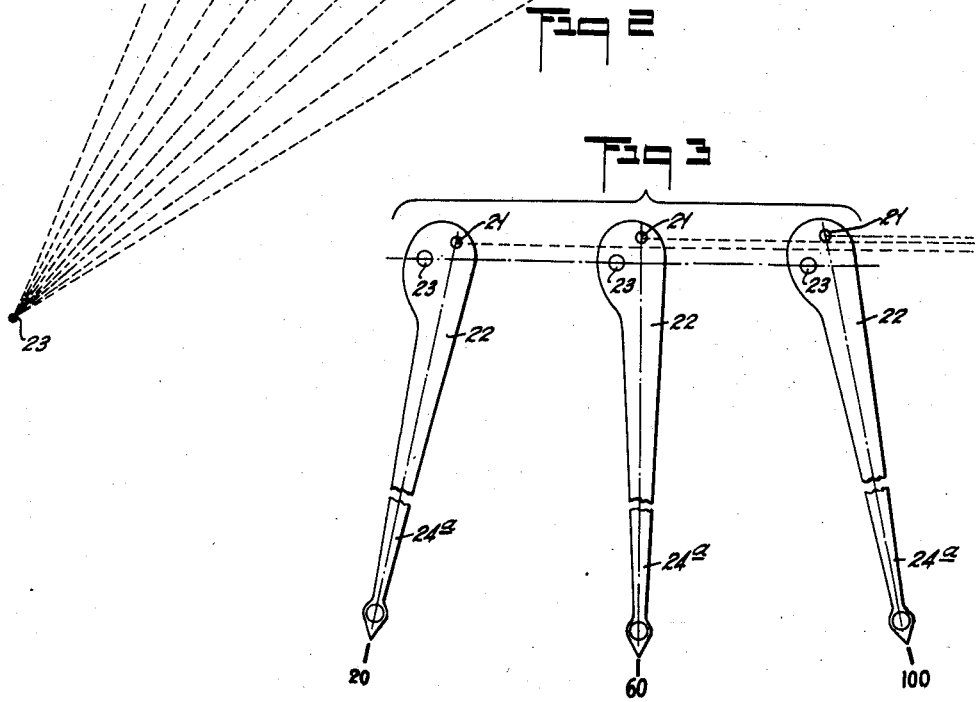
INVENTORS.
ROBERT J. STREB.
RALPH R. CHAPPELL
JOHN MEAGHER.
BY Stephen Cerstvik.
ATTORNEY.

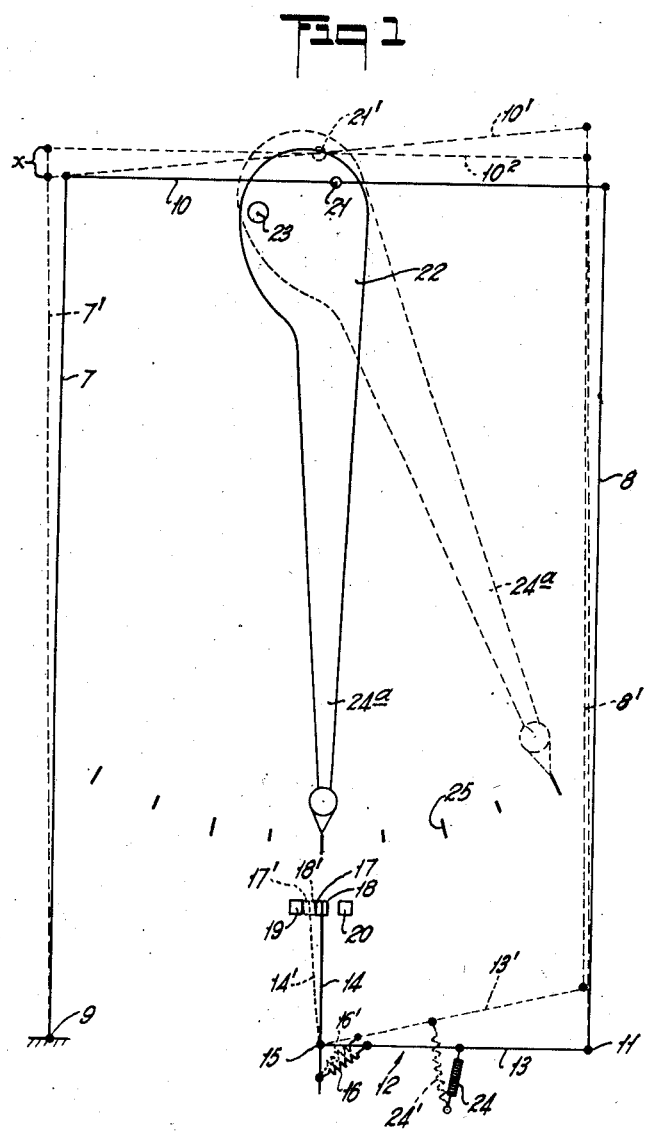

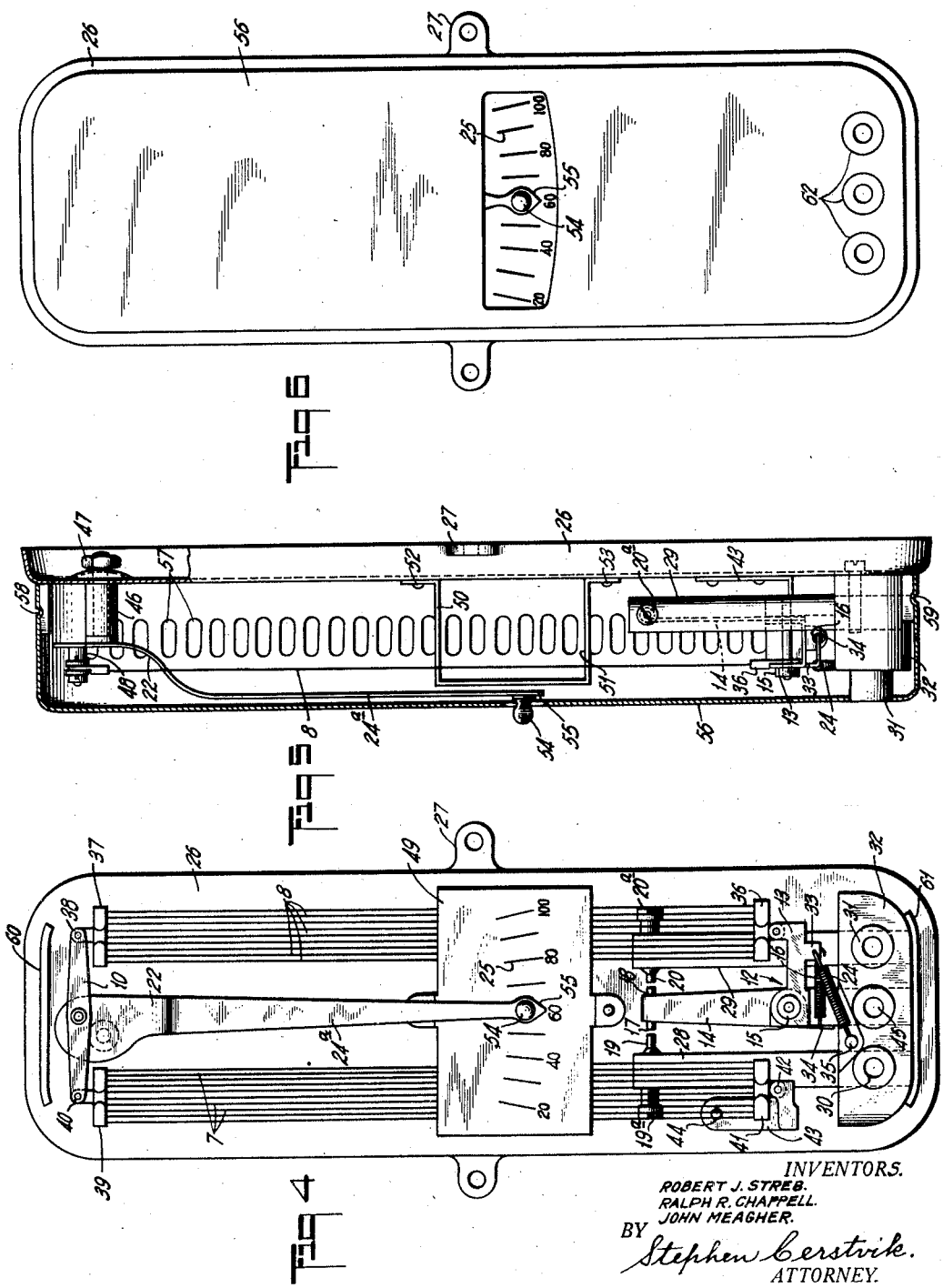

April 16, 1935.    R. J. STREB ET AL    1,998,340
HYGROSTAT
Filed Sept. 3, 1932    4 Sheets-Sheet 4
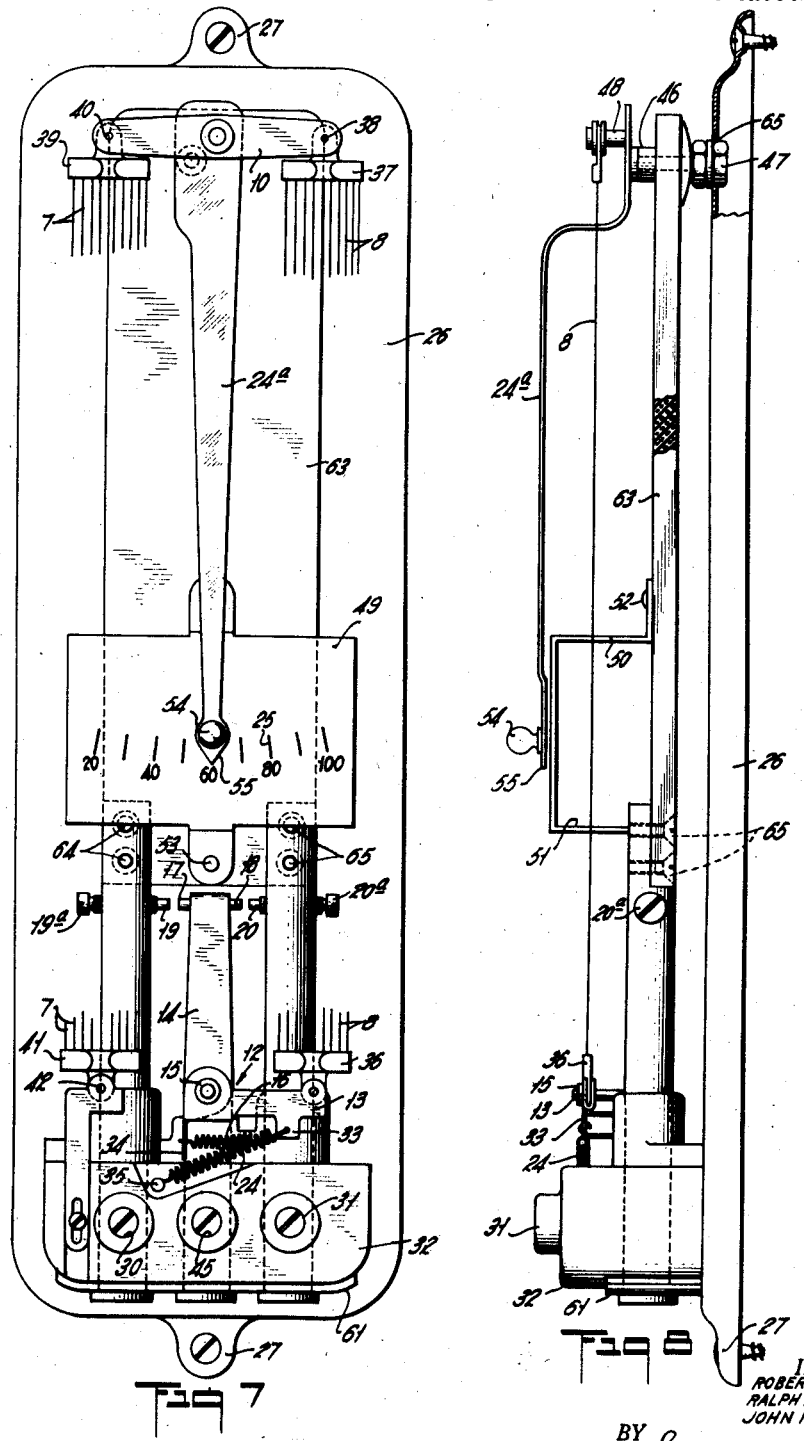
INVENTORS.
ROBERT J. STREB.
RALPH R. CHAPPELL
JOHN MEAGHER
BY Stephen Cerstvik
ATTORNEY.

UNITED STATES PATENT OFFICE 1,998,340

HYGROSTAT

Robert J. Streb, Baltimore, Md., Ralph R. Chappell, Richmond, Va., and John Meagher, Baltimore, Md., assignors to Bendix Aviation Corporation, South Bend, Ind., a corporation of Delaware Application September 3, 1932, Serial No. 631,708

29 Claims. (Cl. 200—52)

The present invention relates to controlling devices and more particularly to controlling devices of the hygroscopic type.

In relative humidity indicating, recording and/or controlling devices it has been found that human hairs are the most sensitive and accurate and, therefore, the most suitable for use as the hygroscopic or humidity-responsive elements thereof.

It is well known, however, that the elongation of a strand of hair per unit length per per cent change in relative humidity decreases with increasing values of relative humidity. For this reason, when an indicating scale is employed which is proportional to the elongations of the hair, such scale will be greatly compressed in the upper ranges of relative humidity thereby rendering it difficult to read the scale in said upper ranges and/or to make settings of the control device having such scales for operating auxiliary apparatus at predetermined values of relative humidity in said upper ranges.

It has also been found that when the hygroscopic element is mounted directly on the base of the instrument, and the base secured to a rough and uneven wall, said base tends to buckle thereby distorting the entire structure and destroying calibration of the instrument.

Accordingly one of the objects of the present invention is to provide a novel structure in a hygrostat whereby the foregoing difficulties are eliminated.

Another object is to provide a hygrostat adapted for wall mounting embodying a novel structure wherein the hygroscopic element thereof is supported only at one point with respect to the base of the instrument so that when the latter is secured to a rough and uneven wall it is not possible to change the relation of the operating parts by bending of the base which may occur when the instrument is so secured.

Another object of the invention is to provide, in a hygroscopic device, novel means whereby a uniform and equally divided indicating scale may be used even though unequal changes are produced in the sensitive element of the device.

Another object is to provide a novel humidity-responsive device adapted for controlling the operation of auxiliary apparatus, such as air-conditioners, to maintain the humidity constant in a confined area or space such, for example, as a room or building.

Another object is to provide, in a humidostat or hygrostat embodying make and break contacts adapted to close one or more electrical circuits for controlling air-conditioning apparatus, novel means for adjusting the make and break position of said contacts for any predetermined values of relative humidity.

Another object is to provide a hygrostat embodying novel means whereby the same may be set, while in operation, to maintain a predetermined relative humidity.

A further object of the invention is to provide a hygrostat embodying novel means for setting the same whereby an equally divided scale may be used for indicating the settings and whereby accurate adjustments may be made throughout the entire range for controlling air-conditioning apparatus so that the latter will maintain a desired predetermined percentage of humidity throughout a full range from zero per cent to saturation, or throughout any other desired range.

Still another object is to provide a novel hygrostat embodying make and break contacts which is so designed for adjustment that either a close range of humidity may be maintained or a wider range where wear and tear on air-conditioning equipment is of greater importance than close control of moisture content of the air.

A still further object is to provide a humidostat or hygrostat embodying a novel structure which is compact and suitable for either industrial or domestic installations, and novel setting means therefor whereby a smaller indicating scale is made possible and, therefore, making it easier to manufacture the instrument more economically.

The above and other objects and advantages of the invention will appear more fully hereinafter from a consideration of the detailed description which follows when taken in connection with the accompanying drawings wherein one embodiment of the invention is illustrated. It is to be expressly understood, however, that the drawings are for the purpose of illustration and description only and are not designed as a definition of the limits of the invention, reference being had to the appended claims for the latter purpose.

In the drawings, wherein like reference characters refer to like parts throughout the several views, Fig. 1 is a diagrammatic illustration of a simple form of the invention showing the manner of setting and operation;

Fig. 2 is an enlarged graph showing the relation of the positions of the adjusting mechanism to the elongation or extensions of the hygroscopic element for various percentages of relative humidity;

Fig. 3 shows diagrammatically three positions of the novel setting means for settings of 20%, 60% and 100% of relative humidity;

Fig. 4 is a front elevation, with the cover removed, of one practical form of instrument embodying the invention;

Fig. 5 is a side view, partly in section, of the instrument shown in Fig. 1 and having the cover secured thereto;

Fig. 6 is another front view of the instrument with the cover attached and showing the scale and index member through said cover so that said index member is readily accessible for setting the instrument;

Fig. 7 is a front elevation, with the cover removed, of another embodiment of the invention illustrating the manner of mounting the hygroscopic element and the associated working parts only at one point with respect to the base of the instrument; and Fig. 8 is a side view of the instrument shown in Fig. 7.

The function of the device embodying the present invention, as will appear more fully hereinafter, is to maintain at a desired percentage the moisture content of the air within the desired space or area, such as in a room or building, by controlling the operation of air-conditioning apparatus such as a humidifier which adds moisture to the air whereby the relative humidity may be controlled in a manner similar to that of a thermostate which controls the application of heat to maintain desired temperatures. The device embodies a hygroscopic element in the form of human hairs which expand and contract as the moisture content of the air varies, although obviously other suitable hygroscopic elements may be employed. The expansion and contraction of the hygroscopic element or elements is multiplied by suitable means such, for example, as a lever mechanism to provide sufficient action to make or break electrical contacts for closing and/or opening one or more electrical circuits embodying the air-conditioning apparatus, either directly or through relays and/or auxiliary switching apparatus. The device also embodies a novel means for setting the same so that said contacts will be opened and/or closed at a predetermined percentage of relative humidity, said means including a setting scale having a cooperating index member so connected and arranged with respect to the hygroscopic element and the electrical contacts that equal movements of said index member along the scale are translated into unequal setting movements of the contacts corresponding to the increments of change in the length of the hygroscopic element in the range of relative humidity for which the device is set to operate, thereby permitting the use of a smaller scale having equal divisions thereon.

Referring to the drawings and more particularly to the diagrammatic illustration of Fig. 1, the instrument of the present invention comprises, as shown, two sets 7 and 8 of hygroscopic elements which, preferably, are constituted by human hairs, although other suitable hygroscopic elements may be employed. One of the sets of hygroscopic elements, for example, the set 7, is pivotally secured at one end to a fixed support 9 and at the other end to an equalizing bar 10, and the other set 8 is pivotally secured at one end, as indicated at 11, to a bell-crank lever 12 and at the other end to the opposite end of the equalizing bar 10. The bell-crank lever is constituted by a pair of arms 13 and 14 jointly pivoted at 15 and interconnected by means of a spring 16 so that the arm 14 will move with the arm 13 about the pivot 15 upon expansion and contraction of the two sets of hygroscopic elements 7 and 8. Carried by and movable with the arm 14 are a pair of contacts 17 and 18 which are arranged to cooperate with a pair of fixed contacts 19 and 20, respectively, to open or close electrical circuits with which the contacts 17, 19 and 18, 20 are adapted to be connected through suitable terminals for controlling air-conditioning apparatus such, for example, as a humidifier. The equalizing bar 10 is pivoted at 21 on a member 22 which, in turn, is pivoted at 23 to a fixed support. The latter may be the same as that to which the set 7 of the hygroscopic elements is pivoted. A spring 24 is provided for pulling the bell-crank lever 12 to close the contacts 18, 20 and to open contacts 17, 19 upon elongation of the hygroscopic elements 7 and 8, and has one end thereof secured to a fixed support and its other end connected to the arm 13.

The operation of the device, as shown diagrammatically in Fig. 1, is as follows: In order to set the instrument to maintain the humidity at a certain value, the arm 24a is moved along the scale to such value indicated on said scale, such movement thereby brings the pivot 21 and equalizing bar 10 to the positions 21' and 10', thus moving contacts 17, 18 to the position 17', 18', i. e., away from fixed contact 20 and against fixed contact 19 so that greater expansion of the hairs 7 and 8 will be required to close contacts 18 and 20. The hygroscopic element is not stretched by this adjustment as the arm 14 of the bell-crank is driven by the spring 16 and the shift necessary in the relative positions of levers 13 and 14 is taken up by the stretch in spring 16. Then when the hairs 7 are elongated by an amount $x$ the bar 10 will assume the position indicated in dotted lines at $10^2$ causing the arm 13 of toggle 12 to move downward by the action of the spring 24; but the hairs 8 will also be elongated the same amount as hairs 7 thereby causing a further downward movement of arm 12 until contact 18 engages contact 20.

The contacts 17, 18, 19 and 20 may be connected in circuit with a latch relay (not shown) in such a manner that when the relative humidity increases and contacts 18, 20 are closed, the relay is effective to stop the operation of a humidifier, and when the humidity decreases and the contacts 17, 19 are closed, the relay is effective to start the humidifier. If desired, a relay with a holding coil may be employed or any other known arrangements generally employed with thermostats, motor-starters, etc. In this manner the relative humidity of the air in a confined area of space, such as a room or building may be maintained constant.

It is desirable that the instrument be capable of being set to maintain the relative humidity constant at any predetermined value, and for this purpose means are provided for setting the operating position of the movable contacts 17 and 18 with respect to the fixed contacts 19 and 20 in proportion to the expansion and contraction of the hygroscopic elements within the range of relative humidity in which it is desired to operate the air-conditioning apparatus. In the form shown, said means comprise the member 22 which is angularly adjustable about the fixed pivot 23 and which is provided with an extension 24a constituting an index or pointer cooperating with a scale 25 calibrated in per cent of relative humidity, whereby the percentage of relative humidity for which the instrument is set may be indicated on said scale. The location of the pivots 21 and 23 with respect to the member 22 and the equalizing bar 10 is so selected that when the index member 24a moves through equal angular distances about the pivot 23, the pivot 21 moves through unequal vertical distances, i. e., the projections of the positions of the pivot 21 against a vertical line parallel to the center line of the instrument are unequal for equal angular increments and correspond to the unequal increments of expansion and contraction of the hygroscopic elements, thereby making it possible to have equal divisions on the scale 25 so that a smaller scale may be employed than would be possible if the divisions on the scale were proportional to the unequal increments of expansion and contraction of the hygroscopic elements 7 and 8. Such unequal vertical movements of the pin 21 produce unequal setting movements of the contacts 17 and 18 through the equalizing bar 10, elements 8 and bell crank 12, so that said contacts are adjusted to a control position such that an expansion of the elements 7 and 8, equal to the distance they have been moved in setting, will cause the spring 24 to close contacts 18 and 20, and to open contacts 17 and 19.

The positions of the pivots 21 and 23 may be determined, for example, as shown in Fig. 2, by first drawing on a chart a graph or a curve showing the per cent of the total extension or elongation of the hygroscopic elements, human hairs in the present instance, for the various percentages of relative humidity from zero per cent to 100% saturation, from data obtained by experiment. This produces the curve indicated as $a$ on the chart. Then horizontal lines $b$ are drawn parallel to the "per-cent-relative-humidity" axis at the point where the curve $a$ intersects the vertical or ordinate lines. An arc $c$ is then drawn across the chart, by trial, until it is found that the distances along said arc from one point to the next, at which said arc intersects with the dotted horizontal lines, are equal. When the position of the arc $c$ is found, the center from which the arc was drawn will give the position of the pivot 23, and the radius of the arc will determine the distance at which the pivot 21 must be from the pivot 23, the arc $c$ being the path of the pivot 21 for the various percentages of relative humidity. Therefore, although the index member 24a moves through equal angular distances as indicated by the arc $c$ in Fig. 2, the vertical distances through which said pivot travels are unequal and correspond to the unequal increments of the elongation of the human hairs. Thus, it will be seen that by selecting the proper locations of the pivots 21 and 23 about which the equalizing bar 10 and the index arm 24a are adapted to be moved angularly, the scale 25 with which the index arm cooperates may then be divided into equal increments whereby a smaller scale may be employed and settings of the contacts made more easily and more accurately for any values of relative humidity from zero moisture content to saturation.

In Fig. 3 there are illustrated three positions of the index member 24a for 20%, 60% and 100% relative humidity, respectively, showing the unequal vertical distances through which the pivot 21 travels for equal angular distances of travel of the index member 24a in the manner shown graphically in Fig. 2 and described above.

Referring now to Figs. 4, 5 and 6, there is shown a practical form of instrument embodying the invention and as illustrated, is constituted by a base 26 formed, as by stamping, of some suitable material such as sheet metal, and provided with ears or lugs 27 for mounting the instrument on a wall or bracket in the region in which the humidity is to be controlled. The fixed contacts 19 and 20 are carried by conducting supports 28 and 29, respectively, which are electrically connected to suitable terminals or binding posts 30 and 31, respectively, and insulated from the base 26 by an insulating block 32 on which the terminals are carried. The movable contacts 17 and 18 are carried by the arm 14 which, together with arm 13, are pivoted about 15 and constitute the bell-crank 12. The spring 16 is connected to the arms 13 and 14 by suitable projections 33 and 34 provided on said arms 13 and 14, respectively. The spring 24 has its one end connected to the projection 33 and its other end to the insulating block 32 as indicated at 35. The arm 13 has pivotally secured thereto a clamp 36 which grips the hairs 8 at one end thereof and the other ends of said hairs being gripped by a similar clamp 37 which is pivotally connected to the equalizing bar 10, as indicated at 38. Another bracket 39 is pivoted to the opposite end of the equalizing bar at 40 and grips the other set 7 of the human hairs at one end thereof, while the opposite ends of the hairs are fastened to a fourth clamp 41 pivoted at 42 to a bracket 43 which is secured to the base 26 in any suitable manner as by means of a rivet 44. The arm 14 is electrically connected to a terminal 45 also carried by the insulating block 32 between the terminals 30 and 31. The member 22 and index arm 24a are pivoted to the base 26 by means of a pin 46 (Fig. 5) secured to the base in any suitable manner as by means of a nut 47, said pin 46 constituting the pivot 23 shown in Fig. 1, and the pivot 21 is formed by a pin 48 secured to the member 22. The scale 25 is etched on a plate 49 which has formed integral therewith a pair of arms 50 and 51 bent inwardly at right angles to the plate for securing the latter to the base in any suitable manner, as by means of rivets 52 and 53. In order to facilitate the angular adjustment of the index arm 24a, the latter is provided with a knob 54 at the index end thereof and said end is shaped to a point 55 so that the indications on the scale 25 may be read more easily and accurately.

Means are also provided whereby the hygrostat may be so adjusted that either a close range of humidity may be maintained or a wider range, as desired. In the form shown in Figs. 4 and 5 said means comprise a pair of screw members 19a and 20a to which are secured, or formed integral therewith, the fixed contacts 19 and 20, respectively. The screw members are threaded within the conducting supporting arms 29 and 30, respectively, so that the fixed contacts may be adjusted thereby increasing or decreasing the distance therebetween through which the movable contacts 17 and 18 are adapted to travel to open and/or close their associated circuits. By increasing the distance between said fixed contacts a wider range of humidity control is obtained and by decreasing the distance a closer range is secured.

In order to protect the instrument from breakage and from getting out of adjustment, a suitable cover 56 is provided having a plurality of openings 57 along the sides thereof, so that air may circulate therethrough and act upon the hygroscopic elements. The cover is provided with indentations 58 and 59 at the top and bottom thereof, respectively, which are adapted to engage similar indentations in metal pieces 60 and 61, respectively, carried by the base 26. A plurality of circular openings 62 are also provided in the front of the cover at the bottom thereof which coincide with the terminals 30, 31 and 35 so that wires may be connected to the latter for controlling the electrical circuits of the air-conditioning apparatus.

As has been pointed out hereinbefore, it has been found that when the hygrostat is secured to a rough and/or uneven wall there is a tendency of the base thereof to buckle, and if the hygroscopic element and its associated operating parts are mounted directly to or at more than one point with respect to said base, there is danger of distorting the entire structure and destroying the calibration of the instrument. To avoid such distortion, there is shown in Figs. 7 and 8 another embodiment of the invention wherein the hygroscopic element is mounted at only one point with respect to the base of the instrument. For this purpose there is provided an insulating plate 63, preferably rectangular in shape, although it may have any other suitable shape, and said plate is secured to the supporting arms 28 and 29 in any suitable manner as, for example, by means of two sets of screws 64 and 65. This plate 63 then constitutes the fixed support for the pivot pin 46 instead of the base 26, and said pin is secured to the plate 63 by means of the nut 47 in the same manner as in the embodiment shown in Figs. 4 and 5. An opening 66 is formed in the base 26 adjacent the nut 47 to provide clearance for the latter. Since the plate 63 is secured only at one end thereof to the arms 28 and 29, the latter in turn being secured to the base 26 by means of the insulating block 32 carried by said base, it is seen that the hygroscopic elements 7 and 8 and the working parts constituted by the arm 24a, equalizing bar 10 and pivot pins 46 and 48, carried by the plate 63, are secured to the base 26 at only one point with respect thereto, namely, at the end of the plate 63 opposite to that which carries the pivots 46 and 48. Therefore, the entire structure is free of the base beyond the single point of support and no distortion can take place even though the base 26 may buckle when secured to a rough or uneven wall by means of the lugs or ears 27 which, in this embodiment, are located at the ends of the base instead of at the sides shown in Figs. 4 and 5. In the latter figures, the tendency of longitudinal buckling of the plate 26 is substantially prevented by virtue of the location of the lugs 27 at the sides of the plate mid-way between the ends thereof, but transverse buckling is not completely eliminated. In Figs. 7 and 8, however, the plate 26 may be secured to a wall in any manner whatever without danger of distorting the working parts of the hygrostat.

There is thus provided a novel humidistat or hygrostat for controlling the moisture content or relative humidity in a desired region, such as a room or building, and embodying novel means for setting the same whereby an indicating scale having equal graduations thereon may be employed and whereby the adjustment of the operating position of the electrical contacts thereof may be made through the hygroscopic elements without changing the characteristics of the latter, thus permitting setting of the instrument while said characteristics may be changing due to changes in the moisture content occurring while the setting is being made. There is also provided a novel structure which is relatively simple in view of the minimum number of parts employed, thereby making it possible to manufacture the instrument in large quantities at low cost, and one wherein the danger of distortion of the operating parts and, hence, disturbance of the calibration of the instrument due to the possible buckling of the base is prevented.

Although only one form of the invention has been illustrated and described, various changes and modifications in the design and relative arrangement of parts, which will now appear to those skilled in the art, may be made without departing from the scope of the invention. For a definition of the limits of the invention reference will be had to the appended claims.

What is claimed is:

1. In a hygrostat for controlling air-conditioning apparatus, the combination of a fixed contact and a movable contact adapted to open and close an electrical circuit, hygroscopic means for operating said contacts in response to changes in relative humidity, and means for setting said contacts in accordance with changes produced in said hygroscopic means so that they will operate when a predetermined percentage of relative humidity is reached, said setting means including an equally divided scale indicating relative humidity in per cent, an index member cooperating with said scale and having a connection to the movable contact through said hygroscopic means, said connection being such that equal movements of the index member produce unequal movements of the movable contact without changing the characteristics of said hygroscopic means.

2. A hygrostat comprising a fixed contact and a movable contact adapted to control an electrical circuit, hygroscopic means for operating said contacts in response to changes in relative humidity, and means for adjusting the operating position of the contacts so that they will be operated by said hygroscopic means at a predetermined value of relative humidity, said adjusting means being connected to the movable contact through said hygroscopic means in such a manner that equal movements of said adjusting means produces unequal movements of the movable contact without affecting the characteristics of the hygroscopic means, said unequal movements being proportional to the unequal changes in said hygroscopic means for equal increments of changes in relative humidity.

3. In a hygrostat, the combination of a fixed contact and a movable contact adapted to control an electrical circuit, hygroscopic means connected to the movable contact for operating it in response to changes in relative humidity, an indicating scale having equal divisions thereon, and an index member cooperating with said scale and having a connection with said hygroscopic means such that equal movements of said member along the scale produces unequal movements of the movable contact through said hygroscopic means without affecting the characteristics of the latter so that said movable contact will be operated at a predetermined value of relative humidity by the change produced in said hygroscopic means at said predetermined value of relative humidity.

4. In a hygrostat for controlling the relative humidity in a confined area, the combination of a fixed support, a fixed contact and a movable contact carried by said support and adapted to open and close an electrical circuit, hygroscopic means for operating said contacts in response to changes in relative humidity, said hygroscopic means comprising two sets of human hairs, a pivoted equalizing bar to the ends of which the end of each set of human hairs are pivotally connected, respectively, means pivotally connecting the other ends of one set of human hairs to the fixed support, means pivotally connecting the other ends of the other set of human hairs to the movable contact, and means for setting the operating position of said contacts in accordance with changes produced in the length of said human hairs so that the contacts will operate when a predetermined percentage of relative humidity is reached, said setting means including an equally divided scale and an index member cooperating with said scale and pivoted on the fixed support and pivotally carrying the equalizing bar thereon, the distance between the point at which the index member is pivoted to the fixed support and the point at which the equalizing bar is pivoted to said index member being so selected that equal movements of the index member produces unequal movements of the movable contact without changing the characteristics of the human hairs, and so that said unequal movements are proportional to the unequal elongation of the human hairs at the predetermined relative humidity.

5. In a hygrostat for controlling the relative humidity in a confined area, the combination of a fixed support, a fixed contact and a movable contact carried by said support and adapted to open and close an electrical circuit, hygroscopic means for operating said contacts in response to changes in relative humidity, said hygroscopic means comprising two sets of human hairs, a pivoted equalizing bar to the ends of which the end of each set of human hairs are pivotally connected, respectively, means pivotally connecting the other ends of one set of human hairs to the fixed support, means pivotally connecting the other ends of the other set of human hairs to the movable contact, means for setting the operating position of said contacts in accordance with changes produced in the length of said human hairs so that the contacts will operate when a predetermined percentage of relative humidity is reached, said setting means including an equally divided scale and an index member cooperating with said scale and pivoted on the fixed support and pivotally carrying the equalizing bar thereon, the distance between the point at which the index member is pivoted to the fixed support and the point at which the equalizing bar is pivoted to said index member being so selected that equal movements of the index member produces unequal movements of the movable contact without changing the characteristics of the human hairs, and so that said unequal movements are proportional to the unequal elongation of the human hairs at the predetermined relative humidity, and means separate from said setting means for adjusting the distance between the contacts to vary the range of humidity to be controlled.

6. In a hygrostat including a flexible hygroscopic element and electrical contacts adapted to be operated thereby in response to changes in humidity, the combination of a base of relatively flexible material adapted to be secured to a wall and capable of being bent or buckled when the wall is rough and uneven, and means supporting said element at only one point with respect to said base whereby distortion of the element due to bending or buckling of said base is prevented.

7. In a hygrostat including a flexible hygroscopic element and electrical contacts adapted to be operated thereby in accordance with changes in humidity, the combination of a base of relatively flexible material adapted to be secured to a wall and capable of being bent or buckled when the wall is rough and uneven, and a plate on which said hygroscopic element and its associated operating parts are mounted, said plate being substantially parallel to said base and having only one end thereof secured to said base and the other end free, whereby distortion of the hygroscopic element and relative displacement between the operating parts associated therewith due to bending or buckling of said base is prevented.

8. In a hygrostat including two sets of elongated flexible elements having one of their ends connected to an equalizing bar, and fixed and movable electrical contacts adapted to be operated by said elements, the combination of a base of relatively flexible material adapted to be secured to a wall and capable of being bent or buckled when the wall is rough and uneven, an insulating block secured to said base and having the other end of one of the sets of elements pivotally fixed thereto, conducting arms mounted on said block and carrying the fixed contacts, and an insulating plate having one end secured to the arms and the other end free thereby providing only one point of support for the plate with respect to the base, said plate having the equalizing bar pivotally mounted at the free end so that the flexible elements are also supported at only one point with respect to the base, thereby preventing disturbance of said elements due to bending or buckling of the base.

9. In a hygrostat including hygroscopic means and electrical contacts operated thereby, the combination of a base, and a plate having one end secured to the base and carrying said hygroscopic means at the free end thereby providing only one point of support for the hygroscopic means with respect to said base for preventing disturbance of said means due to any relative movement between the plate and base.

10. In a hygrostat having a fixed and a movable contact adapted to close an electrical circuit, hygroscopic means for operating said contacts, and means for setting the hygrostat to operate at a predetermined percentage of relative humidity, said means including a pointer and an equally divided scale, and means for causing equal movements of the pointer to produce unequal setting movements of the contacts.

11. A device of the class described, comprising, in combination, a hygroscopic element, switching means operated thereby, movable adjusting means associated with said hygroscopic element and said switching means for setting the relative humidity at which the latter is operated by the former, and a mechanical connection between the switching means and adjusting means for moving said switching means to a control position in unequal increments for equal increments of movement of the adjusting means.

12. In a device of the class described, hygroscopic means adapted to expand and contract in unequal increments for equal increments of change in relative humidity, switching means operated thereby, and movable adjusting means for causing unequal increments of movement of the switching means to a control position for equal increments of movement of said adjusting means for setting the percent of relative humidity at which said switching means is operated by said hygroscopic means.

13. In a device of the class described, hygroscopic means adapted to expand and contract in unequal increments for equal increments of change in relative humidity, switching means operated thereby, and movable adjusting means associated with said hygroscopic means and said switching means for setting the percent of relative humidity at which the latter is operated by the former, said adjusting means including an equally divided scale calibrated in percent of relative humidity, a pointer associated with said scale, and a mechanical connection between the pointer and switching means for moving the latter to a control position in unequal increments corresponding to the unequal increments of expansion and contraction of the hygroscopic means and as a result of equal increments of movement of the pointer corresponding to the equal increments of change in relative humidity indicated on the scale.

14. In an instrument having a sensitive element responsive to changes in conditions or operations and having electrical switching means adapted to be operated by said element in accordance with said changes, the combination of a base of relatively flexible material adapted to be secured to a wall and capable of being bent or buckled when the wall is rough or uneven and means supporting said sensitive element at only one point with respect to said base, whereby disturbance of the sensitive element due to bending or buckling of said base is prevented.

15. In an instrument having a sensitive element responsive to changes in conditions or operations, the combination of a base of relatively flexible material adapted to be secured to a fixed support and capable of some distortion when the support is rough or uneven, and means supporting said element at only one place with respect to said base, whereby disturbance of the sensitive element due to distortion of the base is prevented.

16. In an instrument having a sensitive element responsive to changes in conditions or operations and having electrical switching means adapted to be operated in accordance with said changes, the combination of a base of relatively flexible material adapted to be secured to a fixed support and capable of some distortion when the support is rough or uneven, and a plate on which said sensitive element and its associated operating parts are mounted, said plate being substantially parallel to said base and having only one end thereof secured to said base and the other end free, whereby distortion of the sensitive element and relative displacement between the operating parts associated therewith due to distortion of said base is prevented.

17. In an instrument having a sensitive element responsive to changes in conditions or operations, the combination of a base of relatively flexible material adapted to be secured to a fixed support and capable of some distortion when the support is rough or uneven, and a plate on which said sensitive element is mounted, said plate being substantially parallel to said base and having only one end thereof secured to said base and the other end free, whereby disturbance of said sensitive element due to distortion of said base is prevented.

18. In an instrument including a sensitive element responsive to changes or conditions and electrical switching means operated thereby in accordance with said changes, the combination of a base, and a plate having one end secured to the base and carrying said sensitive element at the free end, thereby providing only one point of support for the sensitive element with respect to said base for preventing disturbance of said element due to any relative movement between the plate and base.

19. In an instrument including a sensitive element responsive to changes in conditions or operations, the combination of a base, and a plate having one end secured to the base and having said sensitive element secured thereto at the other end, thereby providing only one point of support for the sensitive element with respect to said base for preventing disturbance of said element due to any relative movement between the plate and base.

20. In an instrument including a sensitive element responsive to changes in conditions or operations, the combination of a base, and a plate having one end secured to the base and having said sensitive element secured thereto at the free end, thereby providing only one point of support for the sensitive element with respect to said base for preventing disturbance of said element due to any relative movement between the plate and base.

21. In an instrument responsive to changes in humidity and including a flexible hygroscopic element, the combination of a base of relatively flexible material adapted to be secured to a substantially flat surface and capable of being bent or buckled when the surface is rough or uneven, and means supporting said element at only one point with respect to said base, whereby distortion of the element due to bending or buckling of said base is prevented.

22. In an instrument responsive to changes in humidity and including a flexible hygroscopic element, the combination of a base of relatively flexible material adapted to be secured to a substantially flat surface and capable of being bent or buckled when the surface is rough or uneven, and a plate on which said hygroscopic element is mounted, said plate being substantially parallel to said base and having only one end thereof secured to said base and the other end free, whereby distortion of the hygroscopic element due to bending or buckling of said base is prevented.

23. In an instrument responsive to changes in humidity and including hygroscopic means, the combination of a base, and a plate having one end secured to the base and carrying said hygroscopic means at the free end, thereby providing only one point of support for the hygroscopic means with respect to said base for preventing disturbance of said means due to any relative movement between the plate and base.

24. In a humidity responsive device, a relatively fixed support, hygroscopic means responsive to changes in relative humidity and comprising two substantially parallel sets of human hairs, an equalizing bar pivotally connected intermediate its ends on said support and having its ends pivotally connected, respectively, to the adjacent ends of the two sets of hairs, means pivotally connecting the other end of one set of hairs to the relatively fixed support, the other end of the other set of hairs being movable with respect to the support in accordance with the cumulative expansion and contraction of both sets of hairs, and a spring for opposing the movement of said other end of said other set of hairs upon contraction of both sets of hairs and for causing the movement of said end upon expansion of said hairs.

25. In a humidity responsive device, a relatively fixed support, hygroscopic means responsive to changes in relative humidity and comprising two substantially parallel sets of human hairs, an equalizing bar pivotally connected intermediate its ends on said support and having its ends pivotally connected, respectively, to the adjacent ends of the two sets of hairs, means pivotally connecting the other end of one set of hairs to the fixed support, and a spring connecting the other end of the other set of hairs to the fixed support whereby said end is moved by and against the tension of the spring in accordance with the expansion and contraction, respectively, of said human hairs due to changes in relative humidity.

26. In a humidity responsive device, a pair of elongated and substantially parallel elements of hygroscopic material, means adapted to be actuated upon expansion and contraction of said elements, and means including an equalizing device connecting said elements together and to said first-mentioned means for actuating the latter and for equalizing the action of said elements on said first-mentioned means.

27. In a humidity responsive device, a pair of elongated and substantially parallel elements of hygroscopic material, means adapted to be actuated upon expansion and contraction of said elements, means including an equalizing device connecting said elements together and to said first-mentioned means for actuating the latter and for equalizing the action of said elements on said first mentioned means, said last-mentioned means also including a spring connected to one of said elements.

28. In a humidity responsive device, a pair of hygroscopic elements, means adapted to be cumulatively actuated upon expansion and contraction of said elements, and means including an equalizing device connecting said elements together and to said first-mentioned means for actuating the latter and for equalizing the action of said elements on said first-mentioned means.

29. In a humidity responsive device, a pair of hygroscopic elements, means adapted to be cumulatively actuated upon expansion and contraction of said elements, means including an equalizing device connecting said elements together and to said first-mentioned means for actuating the latter and for equalizing the action of said elements on said first-mentioned means, said last-mentioned means also including a spring connected to one of said elements.

ROBERT J. STREB.
JOHN MEAGHER.
RALPH R. CHAPPELL.